United States Patent [19]
Acker

[11] 3,801,775
[45] Apr. 2, 1974

[54] METHOD AND APPARATUS FOR IDENTIFYING OBJECTS

[75] Inventor: Norbert Karl Acker, Buchaschlag, Germany

[73] Assignee: Scanner, Inc., Houston, Tex.

[22] Filed: Aug. 7, 1972

[21] Appl. No.: 278,468

[52] U.S. Cl. .................... 235/61.11 E, 340/146.3 H
[51] Int. Cl. ............................................. G06k 9/00
[58] Field of Search235/61.11 E, 61.11 R, 61.11 D; 340/146.3 H, 146.3 WD; 250/219 D, 219 DC

[56] References Cited

UNITED STATES PATENTS

| | | | |
|---|---|---|---|
| 3,513,320 | 5/1970 | Weldon | 235/61.11 E |
| 3,603,728 | 9/1971 | Arimura | 340/146.3 H |
| 3,693,154 | 9/1972 | Kubo et al. | 340/146.3 H |

*Primary Examiner*—Thomas A. Robinson
*Attorney, Agent, or Firm*—Smyth, Roston & Pavitt

[57] ABSTRACT

Method and apparatus for identifying objects by means of data information which may appear in random position and orientation and at random times in a particular area. A data field of particular orientation is provided to such an object, the data field including contrasting data markings arranged in at least one track and a unique position identification marking, identifying location of the data field and having preferably asymmetric characteristic to identify angular orientation of the data track; the particular area is scanned and searched therewith for any position identification marking therein; upon detecting such a marking its location as well as the direction of the asymmetry thereof is represented by signals controlling data scan along the data track for reading of the data.

17 Claims, 11 Drawing Figures

METHOD AND APPARATUS FOR IDENTIFYING OBJECTS

BACKGROUND OF THE INVENTION

The present invention relates to method and apparatus for identifying objects which may, at times, appear in a particular location where the need for identification arises. More particularly, the invention relates to method and apparatus for preparing objects for quantitative identification and for providing for acquisition of such identification when the need arises.

Objects such as items of merchandise, warehoused components or the like have to be identified at times in machine readable form. For this, machine readable code patterns are affixed or otherwise applied to these objects whereby the code pattern identifies the object to the extent needed. Such identification may include one or more data items such as part number, quality codes, dimensional identification, relevant dates, price, number of content (e.g., items in a box), etc. This identifying data is in some form or another placed on the surface of the objects.

Acquisition of such data is rarely possible under complete exclusion of disturbing influences. Rather, in the general case, the objects differ in size, dimension and, most importantly, the identifying data is not regularly placed thereon. Thus, the acquisition process cannot be based on the assumption that the data be presented in a definite location, with definite orientation and at specified times. In other words, the contemplated acquisition process is not similar to, for example, punched card reading, where a card is placed in a well-defined reading position with edges abutting guide rails, etc., and the completion of placement is well-defined in time. Quite the opposite is true for the general case of data acquisition presently considered. The identifying data in a field on an object appears for identification only more or less approximately in a definite location, which for practical purposes is a random location even though there may be practical confines. Also, the orieintation must be regarded as being at random, so must be the time of appearance.

Take the situation of an automated supermarket check-out facility, the identifying information being price. The objects are the various items of merchandise such as boxes of numerous shapes and sizes, bottles, packages, etc. These items appear one after the other in a check-out counter wherein the prices have to be read and tallied. The only constraint required is that the respective surface of any item bearing the information must face in one particular direction, for example, up. It is impossible, however, to require that orientation and location of the data fields, bearing the price information, is predetermined through positioning of the items; and the several data fields on the different items have varying orientation. Also, the items will not pass through the counter regularly spaced apart, nor will they appear in regular sequence under a reading station. Therefore, the reading station must be in continuous preparedness for reading data, must "look" for the data and read them in proper orientation.

DESCRIPTION OF THE INVENTION

It is an object of the present invention to provide for the acquisition of identifying information and data that may appear at random times in random location and orientation within a specified area.

In accordance with the preferred embodiment of the present invention, it is suggested to provide the identifying information in a data field in one or several data tracks along which data markings are arranged. The location and angular orientation of the data field and its track or tracks are identified by position identifying character markings representing a unique, and therefore, recognizable pattern, when traversed by line scanning, for pin-pointing the presence of and location of a data field in a particular area, covered by the scanning process. The character markings taken together may have asymmetric configuration so as to identify the beginning and direction of the data tracks. After having recognized and detected location and orientation, the data tracks are scanned for data field read-out.

The position identification character marking should comprise at least one portion which, when scanned across by a scanning line, results in a video output whose change in brightness, when digitized, produces a particular bit pattern which can readily be recognized. If that portion is symmetrical, additional markings relative thereto provide directional assymetry which then fixes the orientation of the data field. If the principal portion of the position identification marking has symmetrical configuration, e.g., a circular ring pattern, scanning across in different directions may verify its detection. The objective here generally is to provide for a video signal-bit pattern that is recognizable. The more unlikely it is that the pattern may occur accidentally, the less is there a need for additional verification scanning through the pattern under modified scanning conditions. The asymmetry-defining marking or markings may be have very simple configuration if the probability is low that a similar marking happens to occur in the particular spaced relation to the principal marking without defining a data field.

For example, a circular pattern of concentric rings defines location and, for example, beginning of the track or tracks of a data field; another marking or pattern, different from the first one marks the end of the tracks, and the orientation of the patterns to each other, establish the direction needed for scanning the data tracks. The particular asymmetry resulting from the different configuration of the two patterns establishes the beginning-to-end orientation for the read out. If the ring patterns are similar, the marking as a whole is symmetrical, and data beginning must be distinguished from data end through processing the data as they have been read.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGS. 1*a* and 1*b* show schematically two different but corresponding systems for data field detection and reading;

FIG. 2 shows a data field with position and orientation identification;

FIGS. 2*a* and 2*b* are relevant pulse diagrams for detecting a data field;

FIG. 3 is a block diagram of the system;

FIG. 3*a* supplements FIG. 3;

FIGS. 4 and 5 are orientation diagrams for a data field;

FIG. 6 shows a differently identified data field; and

FIG. 7 is a block diagram to supplement the diagram of FIG. 3 for adapting the system to the field format of FIG. 6.

DESCRIPTION OF THE DRAWINGS

Proceeding to the detailed description of the drawing, we turn first to FIGS. 1*a* and 1*b*, showing two examples for the system generally, which are quite equivalent as far as pertinent aspects of the invention are concerned.

Figures 1A, 1B, 2, 2A, 2B:
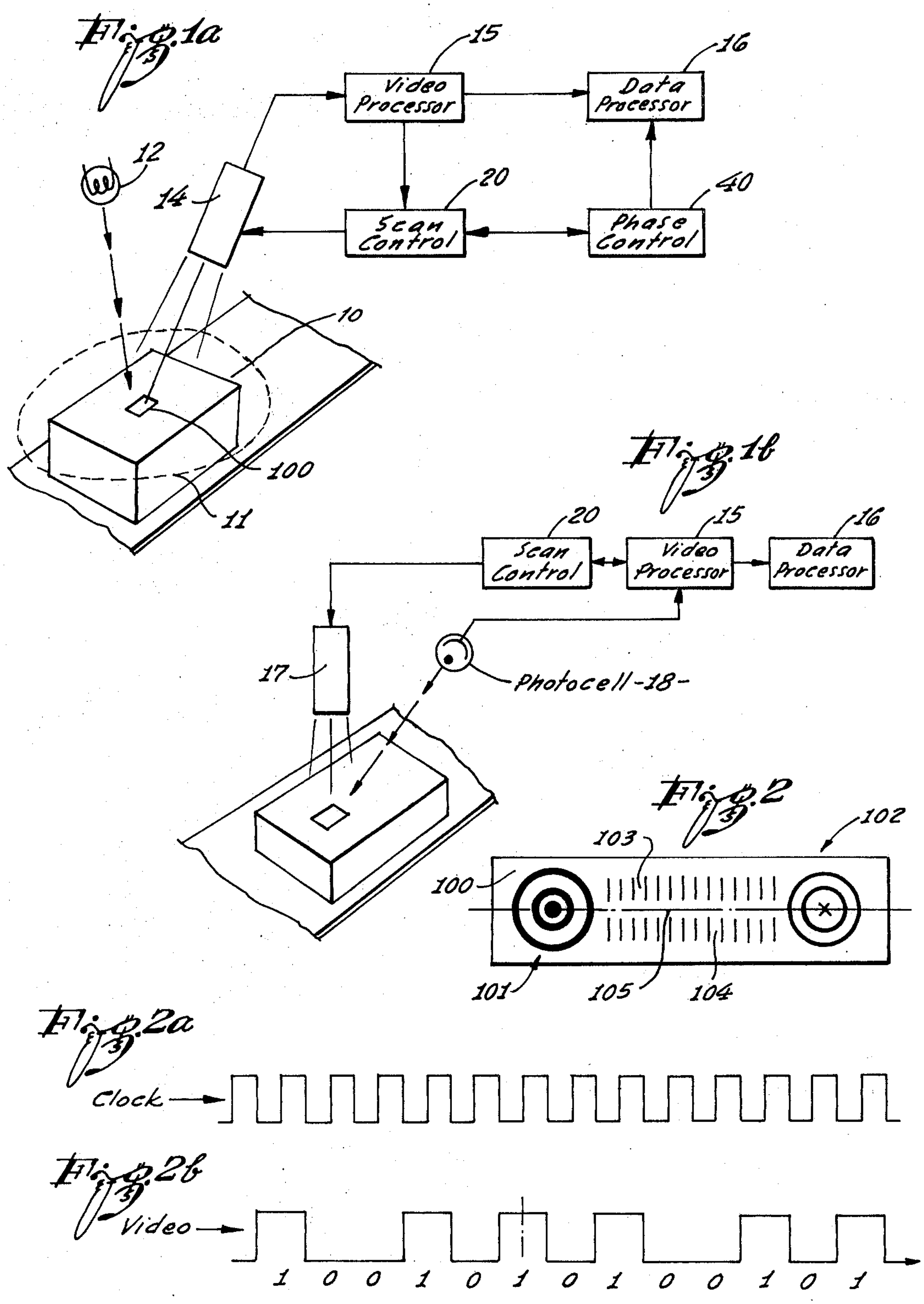
In FIG. 1*a* a scanning and search field 10 is established as a range (in a plane) through which may pass objects, such as 11, bearing an identifying label such as 100. The label may have random position and/or orientation in field 10 and appears therein at an unknown instant. For example, object 11 may be placed manually in that range or may pass through the range and field 10 on a conveyor belt.

The label 100 identifies or otherwise describes relevant information of the item to which it is affixed, such as part number and/or identifying codes with or without quantitative and/or dimensional descriptions and/or price information, etc. Label 100 may not exactly be positioned in the plane of search field 10, there being a certain tolerance range here as will become apparent below.

The purpose of the equipment to be described is to read the content of label 100 without handling the carrier (object 11). Thus the carrier is not to be turned or shifted into a particular reading position for the label. Rather, the label should be read in any position within field 10 and in any orientation therein. The label must, however, be pointing in one particular direction, e.g. up, or to one particular side. The reading equipment of FIG. 1*a* includes a light source 12 (if ambient light is insufficient). A vidicon tube 14 is suitably positioned to observe area 10. The width extension of search field 10 is, therefore, defined by the observation angle of the vidicon tube or by the areas illuminated by source 12, which ever is smaller.

The vidicon tube is controlled by a scan control circuit 20 and provides its video output to a video signal processing circuit 15. These circuits 15 and 20 interact specifically as will be described. In particular, the scan control circuit 20 controls the video tube scanning operation in a manner that is determined by the video output for obtaining a label scan from which the label data can be derived.

The video output constitutes data proper during particular phases of operation of scan control circuit 20. The data is processed in a circuit 16 including checking of legality of the data read. If found not correct, "repeat" is signalled to the scan control circuit, including the possibility of re-search for the label.

FIG. 1b illustrates an alternative design which includes a flying spot scanner 17 for observation of field 10, and a photo electric device 18 is used for obtaining a video output. The scanner 17 is controlled by a circuit 20 analogous to control of vidicon scanning in FIG. 1*a*, and the photo electric video output is processed and utilized by and in circuit 15 in corresponding analogy. The purpose of the equipment 15–20, either in combination with vidicon tube 14 or with equipment 17/18, is to detect a data field or a label by scanning the search field in accordance with a search scanning raster that covers the entire area 10, or at least that border portion through which a label may appear (e.g. in case of a conveyor belt). Additionally, equipment 15–20 is operated so that the data is read in proper orientation and sequence, possibly repeatedly for error checking.

It can readily be seen that the plane of scanning, i.e., the distance of area 10 relative to the scanning equipment, does not have to be too accurately defined. Assuming the items pass on a table, a belt, or the like, and have different heights, the height may vary, for example, by about 1 foot (which is a reasonable range for supermarket items). If the pick up and scan equipment is positioned about 10 feet above, the label varies in image size by about ± 5 percent from a median distance and remains well within depth of field of any optical equipment used. The markings on the label must simply be sufficiently large so that a ± 5 percent size variation does not influence the read out.

FIG. 2 illustrates somewhat schematically an example for data label 100. The label is of rectangular contour and includes, in toto, asymmetric Position Identification Coding, or PIC—for short. The encoding includes a first marking 101 comprised of concentrical contrasting rings which are not equidistantly spaced. The marking 101 is disposed near one end of the label. A second marking 102 is disposed close to the other end of label 100 and is comprised, for example, of a second set of concentric rings having configuration different from the rings of marking 101. The differences of pattern configuration may reside in the number of rings and/or the ring spacing. The respective centers of these rings will be identified as points No. 1 and No. 2, respectively, and an imaginary line 105 runs through the two ring centers.

These two patterns of rings have the following compound purpose:

a. at least one of these markings is to be sufficiently distinctive as far as ring arrangement is concerned, to obtain a definite identification of the location of data field 100 when in the search field to the exclusion of other patterns as they may occur in the search field;

b. more particularly as to a), upon video scanning through the pattern 101 on a line that runs through the center (point No. 1), a pulse pattern should result that is recognizable as being distinctive to the exclusion of all other pulse patterns that may occur upon scanning the search field. FIG. 2a represents a clock pulse pattern concurring with a video scan and, in effect, time-digitizing the scanning operation. Upon scanning on a line through the center of No. 1 of the rings 101, a digitized pulse pattern can be extracted from the video output as depicted in FIG. 2*b* in time correlation to the clock pulses of FIG. 2*a*. It can readily be seen that through more or less arbitrarily choosing ring spacing and number of rings, a more or less predetermined quasi-random pulse pattern will result when detected, whereby the probability of occurrence of such pattern is diminished with the number of rings employed *and* by choosing *unequal* spacing. Accidental occurrence of the depticted pattern is practically excluded due to the duplication and symmetry of the "random" pattern.

c. Recognition of the pulse pattern implies recognition of the center No. 1 of the circles. Therefore, through proper correlation of scan control and video signal processing, the coordinates of the ring center in a scanning raster are readily recognized.

d. As mark 101 is composed of rings, it will be detected, no matter what the direction of the scanning is, or conversely, the scanning raster will traverse the mark 101 regardless of the orientation of label 100!

e. Detecting the mark 101 through recognition of a particular pattern not only implies approximate detection of the location of the label in the search field in terms of scanning coordinates, but also of the one end of the data detected, the "more complicated" rings 101 may be located at the beginning of the data field.

f. Detecting marks 102 in an analogous manner, as recognition of a distinctive but different mark implies analogously detection of the center (point No. 2) of these rings 102. For similar reasons, the orientation of the data field has now been recognized because (i) the data extend between the two markings, (ii) the direction of connecting line 105 between the two centers defines the angular orientation of the label 100, (iii) the relation position of end-of-data marking 102 to beginning-of-data marking 101 establishes the orientation of the data field proper. It should be added here, that in case the PIC's are similar, their detection will not produce beginning and end distinction for the data; that must then be determined separately.

The operation of the equipment 15/20 can, therefore, be particularized as to its objective. First, there will be a general search phase for detecting the presence of a data label in the search field. Second, there will be an orientation search phase for detecting the angular orientation of the label in the search field. These two phases may overlap or even coincide as far as operation control is concerned, and such coincidence will be assumed first for simplification. Later in the specification, it will be described how these phases may be made consecutive (paradoxically) to save time. Third, the scan is to be controlled so that the data are read from the label. The various phases of operation and sub-phases thereof are represented by a phase and timing unit 40 providing suitable control and enabling signals and thereby defining the various operation phases.

In FIG. 2, two data tracks 103 and 104 have been assumed as being symmetrically disposed to line 105 between the centers of the two ring patterns. The data may be encoded as disclosed in my companion application Ser. No. 818,030, filed Apr. 21, 1969, and continued in application Ser. No. 165,078, filed July 23, 1971, which is incorporated by reference for that purpose. (See also German Offenlegungsschrift 2,018,801). The equipment of FIG. 3 provides for the search/detect and read phases and operations, and includes more detailed illustration of the scan control circuit 20.

Figure 3:
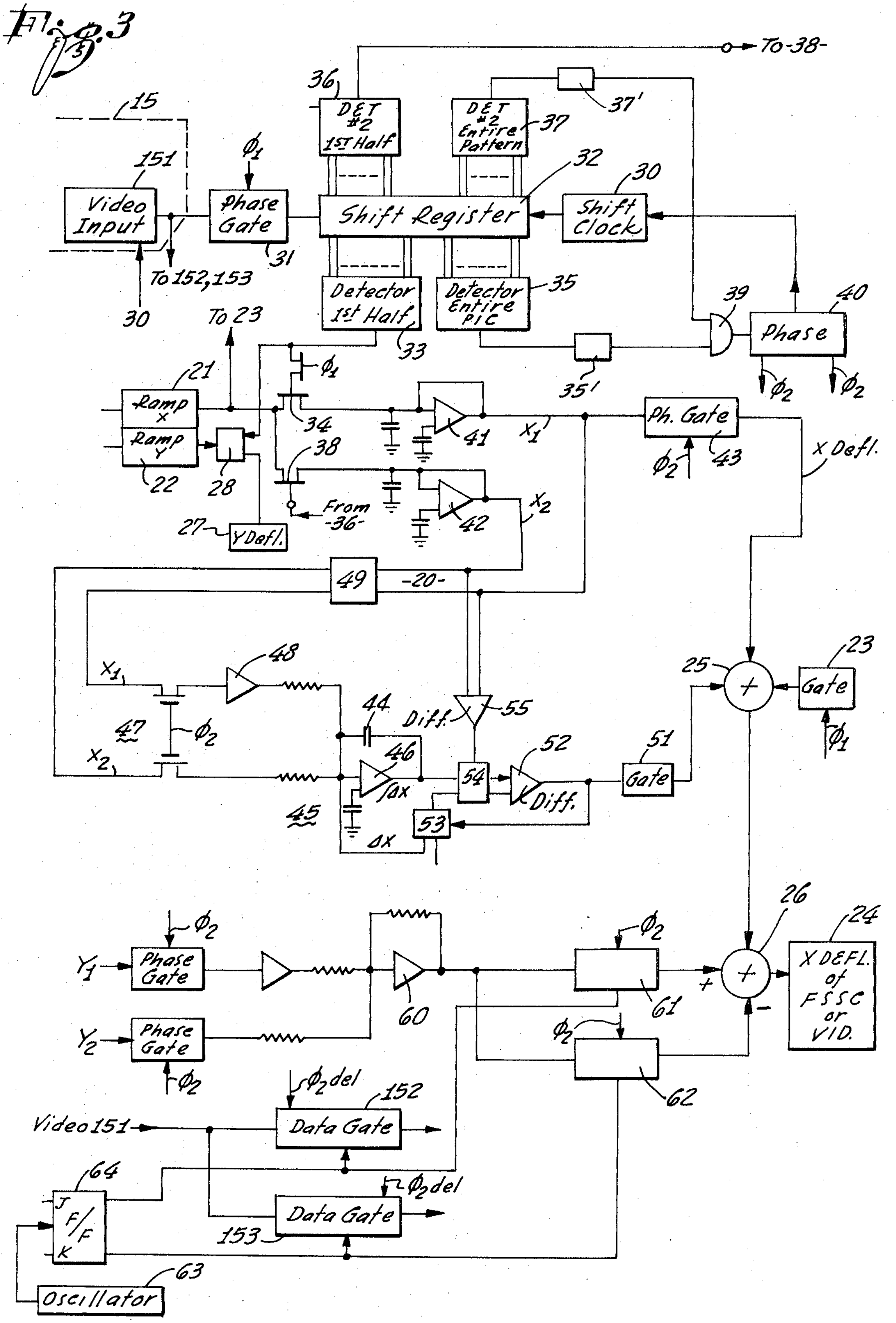

The circuit shown in FIG. 3 includes two ramp signal generators 21 and 22 which may be free-running sawtooth oscillators of different frequencies to obtain "line" and field scan signals for a raster scan. The low frequency of one generator determines the repetition rate of search field scanning. During one complete field scan, every point in search field 10 — FIG. 1, is to be inspected. It makes no difference which one of the two ramp generators is to be fast for "line" scan and which one is to be slow for "field" scan. Also, these two directions of scanning are arbitrary. The scanning does, however, distinguish between two directions in the following called X and Y.

The search/detect phase is identified by a phase signal $\phi 1$ from circuit 40; the ramp generator 21 provides its signal to the X-direction deflection control circuit 24 in vidicon or flying spot scanner. A gate 23 permits the ramp signal to pass to the X-deflection circuit 24 of the vidicon tube or of the flying spot scanner during this phase $\phi 1$. The X-ramp signal runs through several signal summing points 25 and 26, which at this point in the operation receive no other signals.

Ramp generator 22 provides an analogous scan signal for the Y-direction and feeds same to the Y-deflection circuit 27 of the system. The circuit 28 includes for the Y-direction circuitry analogous and similar to the circuitry to be described shortly for the X-direction.

The circuitry 21 through 28 provides a periodically repeated raster scan of the search field, and the concurrently received video information is initially processed in video input circuit 151. The circuit 151, thus, receives an analog-like signal representing the reflective brightness of the spot scanned. Aside from amplification, circuit 151 may include a level discriminator which may also be termed a low resolution digitizer, discriminating only between signals below and those above a particular level. Thus, circuit 151 provides a rectagnular output signal train, wherein the signal level alternates between two levels, more or less at random times, just as the more or less arbitrary optical information content of the search field varies along the scanning line.

The "digitized" video signal may be synchronized with a clock 30 to be presented at the output of circuit 151 at clock-pulse rate. The clock 30 may have frequency with an oscillation period corresponding to the period of propagation of the scanning spot for its width which is, for example, 200 Khz. Thus, as a line is scanned which runs through the center of a ring pattern such as 101 on a label in the search field, a pulse train such as shown in FIG. 2*b* appears at the output of circuit 151. The clock train of FIG. 2*a* is produced by the clock 30. The digitized video signal passes a phase gate 31 and is set into a shift register 32, operated also by clock 30.

As scanning proceeds on a line that runs in any direction through the center of rings 101, the signal pattern of FIG. 2*b* will appear at the input of the shift register and several bits will appear in the order 0, 1, 0, 0, 1, 0, 1, wherein the first "one" stands for the instant of passage of the scanning spot over the outermost ring, the next two "zeros" stand for the spacing between this and the next ring which, by itself is represented by the next "one," followed by a "zero," followed by a "one" for the innermost ring, followed by a "zero," etc.

Thus, when the bit pattern 1, 0, 1, 0, 0, 1 appears in the shift register stages, beginning from the left or shifting entrance, the scanning spot is on the center (No. 1) of markings 101.

A detector-decoder 33 responds to that particular bit pattern and opens a switch 34 connecting the X-ramp generator 21 to a sample-and-hold circuit 41. The value thus gated, for one clock pulse, in to sample-and-hold circuit 41 is $x1$, defining the X coordinate of center point No. 1, of markings 101. The same detector output 33 is fed to circuit 28 for controlling sampling of the corresponding Y-coordinate, $y1$ of the center of markings 101, there being a corresponding sample-and-hold circuit for Y1 included in circuit 28.

As scanning continues, the full bit pattern of FIG. 2b will be in the shift register 32 as soon as the scanning spot passes again over the outermost ring of pattern 101. At that instant, a detector 35 responds in representation of the complete detection of the principle portion of the position identification characters. If that detection is not forthcoming for, in this case, six clock pulses after detection of the center of rings 101, the content of sample-and-hold circuit 41 may be "erased" as an error, the bit pattern having caused response of detector 33 occurred accidentally. The erasor, however, may not be needed, as many sample-and-hold circuits follow a newly sampled input up or down without delay. Thus, even if at any time an erroneously sampled value stands on circuit 41, whenever a new one appears, that "held" value is updated until such time it is deemed the correct one.

Response of detector 35 denotes completion and actual detection of the first marking 101. A bit pattern, such as the one depicted in representation of passage of the scanning spot across markings 101 is quite unique, and it is unlikely that it can be represented accidentally otherwise. However, even that unlikely event will be recognized later, as will become apparent below. The output of detector 35 may set a flip-flop 35, enabling one input of a coincidence gate 39.

Another detector-decoder 36 responds to a bit pattern in representation of a bit pattern in register 32 after the scanning spot has just passed over one-half of the second ring pattern 102. This detection will occur earlier or later than the detection of pattern 101. A first verification of the fact that the center (point No. 2) of the ring pattern 102 has been detected, occurs when six-clock pulses later a full decoder 37 responds. Detector-decoder 37 responds to the bit pattern resulting from passage of the scanning spot across the entire ring pattern 102, through center point No. 2.

The output of center detector 36 briefly opens another switch 38 connecting $x$-ramp generator 21 to another sample-and-hold circuit 42 for the X-coordinate $x2$ of the center point No. 2 of ring pattern 102. Upon response of the full pattern decoder 37, a second flip-flop 37, is set for feeding its output to the second input of coincidence gate 39. As gate 39 (as an AND gate) receives two true inputs, it produces an output as indication that, in fact, the coordinates for both characters of the complete PIC-pattern has been detected. The output of decoder 36 is, of course, additionally fed to a sample-and-hold circuit in network 28 for storing the output of the Y-generator 22 as the instant of response of detector-decoder 36; that output is, of course, the Y2 coordinate of point 2.

In its simplest form, the detection of the two points No. 1 and No. 2 is entirely independent. For this, both of the ring patterns may be "complicated" so that detection of similar bit patterns not based on such characters is very unlikely in either case. However, it can readily be seen that the second bit pattern may be simple, if the equipment includes timing means, requiring the detection of both patterns within a particular period of time.

Looking at FIG. 2, it can readily be seen that the maximum possible period between detection of the two ring assemblies elaspes, if the label happens to be positioned transverse to the direction of the scanning lines. In this case, the delay is equal to the number of scanning lines between the two lines that pass through the centers of the markings (multiplied by the period of time of scanning one line). Therefore, the two markings must be detected within a period not longer than that delay. In a simple form, each flip-flop 35, and 37, may trigger a delay circuit equivalent to that maximum delay. If at the end of the delay period gate 39 has not responded, the respective flip-flops are reset and PIC searching resumes.

Other constraints are that the sampled signals corresponding to the $x$ and $y$ coordinates of the two centers, must not be further apart than the actual distance between the centers. These conditions can be separately tested through utilization of threshold circuits comparing the sampled differences $x1-x2$ and $y1-y2$ as signals with signals representing maximum permissible values, to eliminate the detection of a "wrong" center. A negative test results again in resetting the flip-flops 351 and 371. A search scanning method without "sophisticated" second character will be explained below.

Figure 3A:
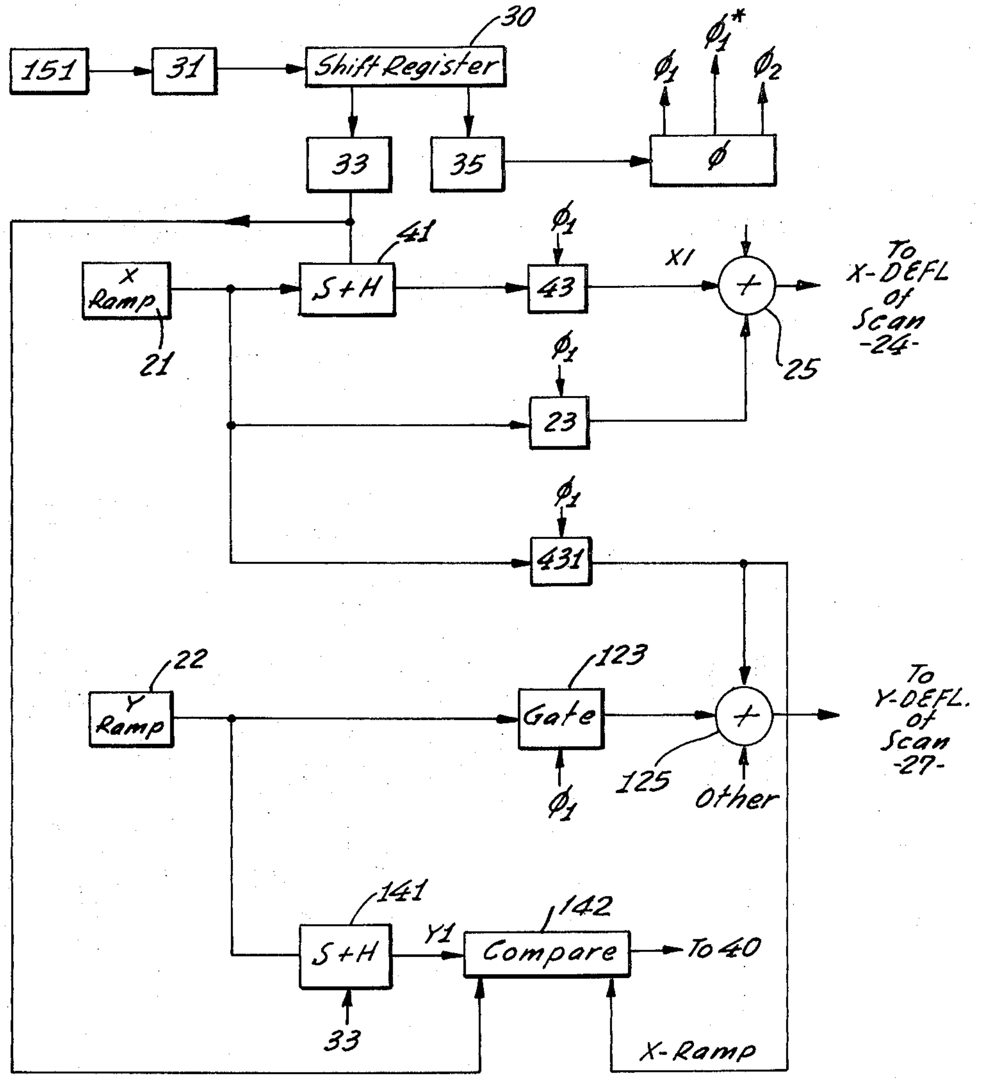

It is rather unlikely (but not totally impossible) that random contrasts in the field produce the bit pattern of FIG. 2b. However, there is some not too remote probability that as the scanning line happens to cross the data markings, a bit pattern such as that for markings 101 may be detected. Of course, a completely incorrect scanning procedure for data reading would be the result. More likely is the accidental detection of a bit pattern corresponding to ring pattern 102, but again the time and distance tests above will eliminate that error. In order to verify proper detection of the markings, one can additionally or alternatively proceed as follows:

With the response of gate 39, the phasing unit 40 shifts to a verify phase $\phi$*1. Details are depicted in FIG. 3a. Assuming that the x-ramp 21 provides the fast scan, the sample-and-hold value x1 from circuit 41 is applied to summing point 25 through a gate 43 to hold the X-deflection system 24 at that level. The $x$-ramp 21 itself is coupled to the Y-deflection circuit by means of a gate 431. This means a scanning line is produced transverse to the search scan lines and through the presumably detected center of ring pattern 101. The normal Y-raster scan is controlled by coupling the Y-ramp generator 22 to a summing point 125 via a phase $\phi$1 controlled gate 123 feeding to the Y-deflection circuit 27. Components 125 – 123 form part of the circuit 28 summarily introduced above.

Now, for the verification scan the detector 33 must respond again when $x$=Y1. A comparator 142 receives the previously sampled-and-held signal for Y1, and the response of detector 33 is used as strobe pulse for the $x$-ramp signal as applied to the Y-deflection circuit. In case of verification, the bit pattern of FIG. 2b is produced by operation of two different transverse scans through the same point, because of the circular character of the marking. If that verification is not forthcoming, the previous detection of point No. 1 was erroneous and the search scan proceeds. Of course, the same verification can be made for ring pattern 102 and the detection of its center $x2/y2$.

Response of AND gate 39 when concurring with or followed by verification as to maximum permissible delay between detection and maximum permissible coordinate differences, terminates the detection of location and orientation of the label. Detection of $x1/y1$ marks the detection of the label itself; detection of $x2/y2$ in relation to $x1/y1$ identifies the direction of scanning for reading the data field. Now pahse $\phi 1$ (or $\phi^*1$) is terminated and phase $\phi 2$ begins.

During phase $\phi 2$ the data field is read. For this, the label is scanned beginning at the center of 101 as starting scan point and running towards pattern 102 along line 105 as it extends between the two centers No. 1 and No. 2. As phase signal $\phi 1$ (or $\phi^*1$) turns false and $\phi 2$ turns true, gate 23 (and others) close while gate 43 (and others) are enabled (or remains enabled if there was a verification scan). Accordingly, the X-deflection system 24 is no longer under under control of $x$-ramp generator 21, and Y-deflection system 27 is no longer under control of $y$-ramp generator 22. Instead, the sampled-and-hold signal $x_1$ is applied through gate 43 (via summing points 25, 26) to circuit 24, and the scanning spot jumps to the center point No. 1 of ring 101, because an analogous gate in circuit 28 applies signal $y1$ from the respective sample-and-hold circuit therein to circuit 27.

Concurrently thereto, another particular ramp generator 45 is triggered. The generator includes a high gain differential amplifier 46 operated as operational, integrating amplifier by means of a feedback capacitor 44. One input of amplifier 46 is capacitively coupled to ground and maintained at ground potential as to a.c. The other input terminal or amplifier receives a summed input signal equivalent to $x2 - x1 = \Delta x$. The signal $x2$ is applied from sample-and-hold circuit 42 via a phase $\phi 2$ operated gate or switches 47, while the signal $x1$ as taken from sample-and-hold circuit 41 is applied to that input terminal of the amplifier via another gate or switch 47 and an inverter 48. Accordingly, the input of generator 45 is a ramp signal whose slope is proportional to $\Delta x$. That signal is applied via a phase $\phi$ operated gate 51 to summing point 25. The switching matrix 49 will be explained later; its state is presently so that, indeed, the signals $x1$ and $x2$ are applied to the input of amplifier 46 st the stated polarity.

As long as the inputs for differential amplifier 46 are kept at floating zero, the output is zero prior to phase $\phi 2$. As phase $\phi 2$ begins, summing point 25 receives the $x1$-signal plus a ramp signal proportional in slope to $\Delta x$, which feed the x-deflection system 24 of the scanning system. There is analogous circuitry in block 28, providing the sum of a signal y1 and of a ramp signal rising at a rate proportional to $\Delta y = y2 - y2$. The proportionality factors for these two ramp circuits can be made similar through appropriate parameter selection so that the two generated ramps have slopes that are similarly proportional to $\Delta x$ and $\Delta y$, respectively.

Figure 4:
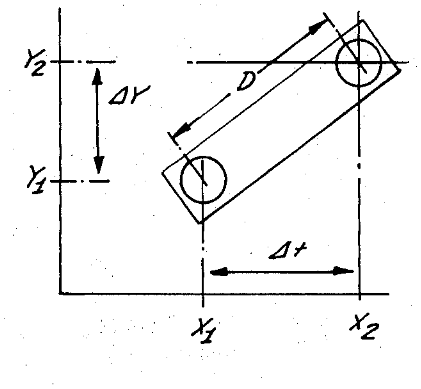

It can thus be seen that the scanning spot moves right from point No. 1 in the center of pattern 101 about connecting line 105 toward the center point (No. 2) of rings 102 (see FIG. 4). This directional scan remains true regardless of the direction, i.e., regardless whether $\Delta x$ and $\Delta y$ are both positive (as assumed in FIG. 4) or whether one or the other or both are negative. Amplifier 46, and the corresponding one in circuit 28 can take positive and negative inputs and may produce positive or negative ramps.

The output of amplifier 46 is also fed to a comparator 52 which may also be a high gain differential amplifier with output clamp or easy saturation, receiving as second input the signal $\Delta x$, possibly via an isolation amplifier and via a switching circuit 53. As long as the ramp signal has not risen to $\Delta x$, the output of differential amplifier 52 may be negative. Upon equality in inputs, the output of the amplifier 52 provides for a steep zero crossing to its opposite (positive) saturation level which serves as enabling signal for reversing the state of switching matrix 49. Matrix 49 exchanges the inputs $x1$ and $x2$. Accordingly, $-\Delta x$ is applied to the integrating amplifier 46 for running the integrator down until reaching zero. Thus, the scanning spot reverses direction of propagation, but remains on line 105. The output of amplifier 52 stays positive until the ramp signal has dropped to zero again, whereupon the $x$-deflection scan has again arrived at coordinate value $x1$. As the $y$-circuitry operates analogously, the scan point is returned to $x1/y1$.

For the circuit to work properly when $\Delta x$ is negative initially, the inputs for the differential amplifier 52 have to be exchanged for the amplifier 52 to provide proper switching states of matrix 49 in dependence upon the polarity of level of its output. This preparatory input switching should be carried out separately, before phase $\phi 2$ begins so that the circuit is in a quiescent state when read scanning begins in the $\phi 2$ phase. Accordingly, a differential amplifier 55 senses the two values $\Delta x$ by being connected directly to the output of sample-and-hold circuits 41 and 42. The output state of amplifier 55 as sensing the polarity of $\Delta x$ determines the state of a switching member 54 that couples the inputs to differential amplifier 52 and in the illustrated manner for positive $\Delta x$ but in the reverse for negative $\Delta x$.

It can readily be seen that the circuit will scan on the line 105 back and forth between points No. 1 and No. 2 as long as the "hold" portions in the several sample-and-hold circuits hold to the values $x1$, $y1$, $x2$, $y2$. This scanning on line 105, however, does not yet scan the data, as the data tracks are above and below this scanning line. Therefore, data reading proper still requires additional steps to be taken. For this, additional scanning spot positioning signals are introduced, via summing point 26.

Referring briefly to FIG. 4, the two increments $\Delta x$ and $\Delta y$ define a particular direction within the observation field as represented on and in the scanning raster, by a pair of coordinates $x$ and $y$ and as defined by the deflector systems 24 and 27. These two values $\Delta x$ and $\Delta y$ when detected, define a line for scanning between the two ring centers. Thus, $\Delta x$ and $\Delta y$ define a particular direction with reference to either point $x1/y1$ or $x2/y2$. The two transformations $\Delta x \rightarrow \Delta Y, \Delta Y \rightarrow -\Delta x = \Delta x \rightarrow -\Delta Y, \Delta Y \rightarrow \Delta x$, each define a direction orthogonal to line 105 in the observation field. Take any point $x/y$ on that line, the two pints $x - \Delta y / y + \Delta x$ and $x + \Delta Y/Y - \Delta x$, define a line of transverse direction. Looking at these relations differently, as $x/y$ vary corresponding to a line scan from $x1/y1$ to $x2/y2$ along line 105, the two points as defined above represent two scan lines parallel to line 105.

Figure 5:
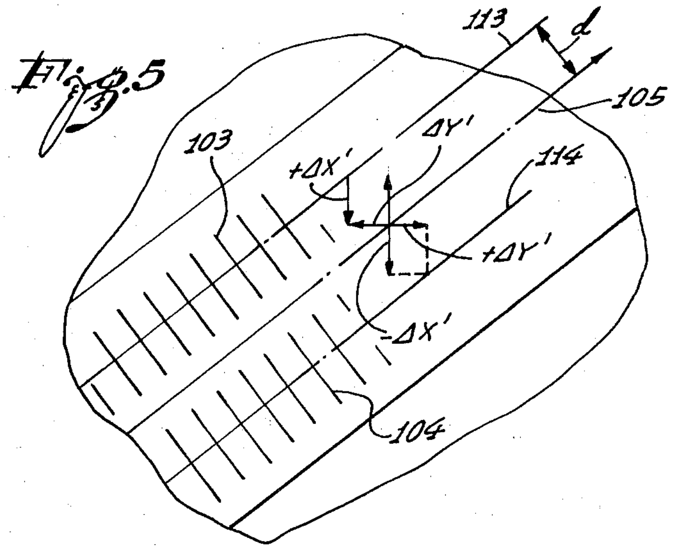

Looking at the label of FIG. 5, the two dotted lines 113 and 114 represent respectively the center lines through the data tracks 103 and 104. These center lines have a distance $d$ from the center line 105 as between the two ring centers. The distance between the two centers is D. If we define the factor K as the ratio $d$/D, then a point in the scan field $x + K\Delta y / Y - K\Delta x$ has distance d from the scan line 105; the point $x - K \Delta Y / Y + K\Delta x$ has also distance $d$ from the scan line 105, but on the other side thereof. As $x$ and $y$ vary in accordance with the line scan operating along line 105, as defined (e.g., from $x1/y1$ to $x2/y2$), these two (by proportional) points "scan" the two center lines 113 and 114 of the two data tracks as defined to the left and to the right of the scan and center line 105 on the data field.

After these preliminary remarks, I continue with the description of FIG. 3. The two signals $y1$ and $y2$ are to be introduced into the $x$-coordinate scan to obtain $x + K \Delta y$. An amplifier 60 with gain smaller than 1 ($K$ is smaller than unity) forms signal $K \Delta y$ to be introduced into the $x$-scan circuit with positive and negative polarity. Two gates 61 and 62 control the alternating insertion signal $K \Delta y$ under control of a high frequency oscillator 63. The oscillator toggles (clocks) a jk flip-flop 64, whose set and reset outputs control respectively the two gates or switches 61 and 62. The signal outputs of these gates lead to summing point 26 to superimpose $+ K \Delta y$ and $- K \Delta y$ upon the $x_i$ + ramp signal formed at summing point 25. As a consequence, the scan point jumps back and forth between lines 113 and 114. The jumping rate is to be significantly faster than the scan rate so that the two data tracks 113 and 114 are scanned simultaneously, in time division, multiplexing fashion.

The flip-flop 64 controls also two video signal gates 152 and 153 in synchronism with the scan point position control, so that the two data gates provide two data channels for the two data tracks. The gates 152 and 153 may include filter circuitry to remove the oscillating frequency of oscillator 63, but the filter must pass the bit rate frequency resulting from passage of the scanning spot over the dark data markings and the white spaces in between. Discrimination here dictates that the multiplexing frequency of oscillator 63 and the data bit rate frequency (as defined by the rate of ramp generator 45 and the corresponding one in the Y-circuit 28) should be sufficiently apart, e.g., one order of magnitude.

A refinement is preferably used here; the data gates 152 and 153 should be opened by a delayed phase signal $\phi 2$ − del. The scanning control starts from $x1/y2$, but the data tracks begin only after the radial dimension of rings 101 has been traversed. Also, the tracks end somewhat before the center of rings 102 has been reached by the principle scan signal from circuit 46 – 25. Thus, phase signal $\phi 2$—Del should turn false after so many bits have been read from both tracks. For the reverse scan the situation is analogous. Alternatively, the scan reverse as controlled by circuit 52, may respond at a value smaller than $\Delta x$ for a somewhat earlier reversal.

The data channels 152/153 connect to data processing circuitry 155 which include assembling of characters and testing of correctness and legality. Also, the data read in true and reverse order are to be compared. For details which are analogously applicable here, refer to copending application Ser. No. 818,030, filed Apr. 21, 1969, and Ser. No. 55,006, filed July 15, 1970. These applications disclose the possibility of repeating the data readout or to even repeat the search scan, e.g., if the data reading was instigated without detection of the label orientation and/or position.

Figure 6:
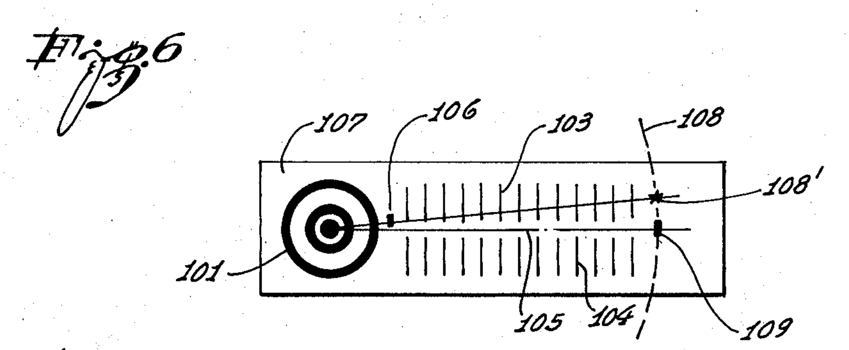

As it can be seen, the asymmetric arrangement of the PIC's permits the accurate determination of the location and orientation of the data field, and the detected values and produced signals permit direct control of a data track scanning operation, including multiplexing in case of plural data tracks for reading of all tracks in one run. The data reading was preceded by a search scan operation in which position and orientation of the data field was detected more or less simultaneously. The modified label of FIG. 6 suggests that these phases be split up into location search and orientation detect phases. The search phase is limited to the detection of a single PIC of more or less complex configuration as described. The center coordinates $x1/y1$ are stored as before, and that terminates the data field search phase, its location has been found.

Figure 7:
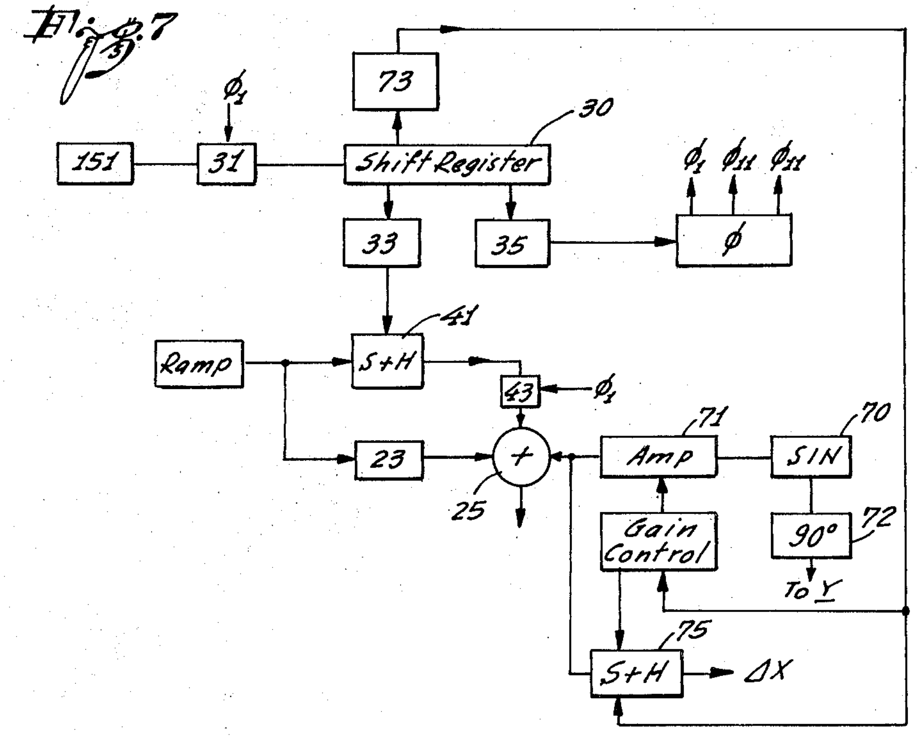

FIG. 7 illustrates the shift register 32, the two detectors 33, 35, ramp 21 and sample-and-hold circuit 41 for the coordinate $x1$. The response of detector 35 via AND gate 39 triggers the phase control circuit to establish $\phi 1$. Pursuant to that phase signal, the coordinate value $x1$ is applied to scanning point 25 for passage to the $x$-deflection circuit as before, causing to home the scanning beam on the center of character (rings) 101. Aditionally, a sine wave generator 70 is enabled to pass a sinusoidal signal via a gain controlled amplifier 71 to summing point 25.

As to the $y$-deflection circuit, either a cosine generator is provided or the output of sine generator 70 is phase shifted by 90° (72) to establish the cosine signal. As a consequence, a circle 107 is scanned around center $x1/y1$. The amplifier 71 (and the corresponding one in the $y$-circuit) determine the radius of that scan circle 107. The radius should be chosen so that the scanning spot just runs on a circle 107 outside of the outer ring of marking 101. That immediate outside space is to be free from information markings (so that a persistent low video signal is clocked in the shift register) except for one marking 106. Marking 106 is just off the center line 105 of the data field. A detector 73 responds to that marking in that a "one" is shifted into the input stage just after many or at least several zeros have been shifted through.

As detector 73 responds, a gain control circuit 74 is triggered to increase the gain of amplifier 71 (and of the corresponding one in the $y$-circuit), so that the radius of the scan circle is increased for almost the length of the data field (circle 108). As only the radius, not the azimuth of scanning, is changed, the scanning spot jumps to about a point 108', which is on line with marking 106 through point No. 1 $x1/y1$, and, thus, still on the label. As scanning is presumed to run clockwise, the scanning spot will soon hit a marking 109 which is on center line 105. That marking 109 is, in fact, the completion marking for the PIC assembly, defining the orientation of the data field to point $x1/y2$. Thus, detection of marking 109 is the direct equivalent of detecting $x2/y2$.

As "spot" detector 73 responds anew, a sample-and-hold circuit 75 on the output of amplifier 71 responds and furnishes directly $\Delta x$. Alternatively, the sample-and-hold circuit 73 may have its input coupled to the output of summing point 25 in which case the sampled value is $x2$. Further processing can then be had exactly as disclosed in FIG. 3 with regard to the read-scan. Sample-and-hold circuit 75 may be gated additionally, for example, to respond only when gain control circuit 74 has been shifted to the higher gain for large-circle scan.

It should be mentioned that in case the two PIC's are identical, the read scan phase will begin after the two PIC's have been detected separately. The data scan may then begin from either point and the proper orientation, i.e., beginning and end of the data field will be determined on the basis that scanning in but one direction will yield meaningful data.

The invention is not limited to the embodiments described above but all changes and modifications thereof not constituting departures from the spirit and scope of the invention are intended to be included.

I claim:

1. The method of identifying objects by means of data information, which objects may appear in random position and orientation and at random times in a particular area, comprising:

providing to a surface of the objects a data field of particular orientation, the data field comprised of contrasting data markings arranged in at least one track;

providing to the data field a unique position identification marking identifying location of the data field and beginning thereof and having characteristic to identify the angular orientation of the data track and having additional characteristic distinguishing the latter marking from the data markings;

scanning the particular area by means of an electronically operated scanner which provides a signal train representing the scanning of the particular area, the signals representing random contrasts in the area when a data field is not in the area;

searching in the signal train for a particular bit pattern in representation of presence of a position identification marking in the particular area by continuously attempting to decode progressing portions of the signal train as a bit sequence, including consistently ignoring any bits that may represent data markings, for detecting a particular location of the latter marking upon successfully decoding a bit sequence; electrically processing the signal train additionally to search for representation of the characteristic identifying the angular orientation of the data track;

establishing first electrical signal on the basis of the searching step for identifying for a location as a beginning of a data scan along the data track in dependence upon the detected location; establishing second electrical signal on the basis of the searching and processing steps for identifying the said angular orientation of the data track;

combining the first and second electrical signal representations for controlling data field scanning including the said scanner for data track reading in dependence upon and on basis of the said combined first and second signal representations; and reading the data track during the field scanning as provided on basis of said signal representations, by electrically processing the signal train as provided by the scanner.

2. The method as in claim 1, wherein the marking has asymmetric characteristic for identifying beginning and end of the data track, and including establishing representation for the data track beginning.

3. The method as in claim 1, wherein the position identification character as provided includes a ring pattern comprised of a plurality of concentric, contrasting rings and the asymmetry includes at least one additional marking in particular relation to the center of the rings and to the extension of the data of the data field, the scanning and searching including the searching for the center of the rings, including the detection of a particular symmetric bit pattern.

4. The method as in claim 3, wherein the additional marking includes a second ring pattern, different from the frist ring pattern as far as ring spacing and/or number of rings is concerned, the detecting including detection of the center of the second ring pattern, the two centers when detected defining the direction of data field scanning.

5. The method as in claim 3, including the additional step of verifying the location of the ring pattern by scanning through the center thereof in a different direction and determining whether or not the same symmetric bit pattern is produced.

6. The method as in claim 4, wherein the additional marking is a contrast marking at one end of the data field, the detection of the direction of the asymmetry including scanning along a circle arc around the center of the ring pattern to detect said additional marking.

7. The method as in claim 1, including the step of detecting first and second coordinate differentials in representation of orientation and of one end of the data field, as well as of the other one thereof, and providing data field scanning through separate ramp generators at slopes respectively proportional to said differentials, along a line as determined by said asymmetry.

8. The method as in claim 7, and including the step of superimposing upon said data field scanning a multiplex operation for simultaneous scanning two parallel tracks as extending along said line.

9. The method as in claim 1, wherein the position identification character is comprised of two spaced-apart ring patterns, the data track extending between them.

10. The method as in claim 1, wherein the electrical processing step includes attempting to decode a progressing portion of the signal train as a bit sequence in particular spatial relation to the detected particular location of the said marking for detecting another particular location upon successfully decoding a bit sequence of the signal train, the two particular locations together representing the direction of extension and orientation of the data field.

11. The method as in claim 10, wherein the additional search of the electrical processing step includes searching for and attempting to decode a different bit pattern.

12. An apparatus for machine reading of information contained in a data field on a carrier which may appear at random times in random position and orientation in a particular area, the data composed of markings arranged in at least two parallel tracks of a data field, the data field identified by a position and orientation pattern and defining the position of the end or of the beginning of the data tracks as well as the angular orientation of the data tracks, comprising:

first means for scanning the particular area along and in a raster scan for detecting the character and providing signals representing a starting point and direction of data read scanning from the point;

second means connected to be responsive to the direction representing signals providing offset signals representing a transverse direction;

third means for generating ramp signals for controlling a read scan in dependence upon said signals as provided by the first means to run in said direction from said point;

high speed multiplexing means for superimposing the transverse offset signals upon the ramp signal for obtaining two parallel running scanning lines for scanning the two data tracks simultaneously and readout means operating in synchronism with the multiplexing means for providing two data tracks as scanned.

13. An apparatus for machine reading of information contained in a data field on a carrier which may appear at random times in random position and orientation in a particular area, the data composed of markings arranged in one or several parallel tracks in a data field, the data field identified by a position and orientation character and defining the angular orientation of the data track, comprising:

electronic scanning equipment having particular disposition in relation to the particular area;

first means for controlling said scanning equipment for scanning the particular area along a raster scan including plural scanning lines covering the particular area and including second means for providing digitized output signal in accordance with the optical content of the area as scanned;

third means connected to the second means to be responsive to the output signal for detecting and decoding a particular bit pattern in the output signal and providing a pair of scan location signals in respresentation of a first particular point on the data field;

fourth means connected to the second means to be responsive to the output signal for detecting a second particular signal pattern and providing a pair of scan location signals in representation of a second point in particular relation to the first particular point;

fifth means connected to the third and fourth means for processing said pairs of scan location signals for obtaining representation on the direction of extension of tracks;

read scan means distinct from the first means, connected to the third, fourth and fifth means for controlling the electronic scanning equipment for data field scanning in response to the spatial relation of the first and second points as provided by the fifth means to obtain data field readout scan covering said tracks; and means including the second means for obtaining digitized output signals as data signals during operation of the read scan means.

14. Apparatus as in claim 13, the read scan means including a pair of ramp generators for concurrently generating ramp signals in two different directions, the ramp generators controlled in response to signals representing coordinate differences of the two points in the two different directions.

15. Apparatus as in claim 13, wherein the position character includes a ring pattern, the third means including a detector responsive to a particular symmetric output signal pattern produced when a scanning line passes through the center of the ring pattern.

16. Apparatus as in claim 15, wherein the third means includes a second detector responsive to half of the symmetric output signal pattern for detecting a particular point in relation to the data field.

17. An apparatus for machine reading of information contained in a data field on a carrier which may appear at random times in random position and orientation in a particular area, the data composed of markings arranged in one or several parallel tracks in a data field, the data field identified by a position and orientation and character and defining at least one particular point in relation to the data track, comprising:

first means for scanning the particular area along a raster scan including plural scanning lines covering the particular area and including second means for providing an output signal in accordance with the optical content of the area as scanned;

third means connected to the second means for converting the output signal into train of bit signals;

fourth means connected to the third means for searching for a particular bit pattern in representation of at least a portion of said character when scanned through;

fifth means connected to the fourth means for controlling the first means to obtain a repeat scan through said character to obtain a verified representation of a data read scan starting point;

sixth means connected to the third through fifth means for obtaining a pair of signals determining the direction of extension of the data tracks in the particular area;

first and second ramp generators providing ramp signals of the pair; and control means controlling scanning for data read-out from the starting point and in the direction in accordance with the signals as provided by the ramp generators.

* * * * *